(12) United States Patent
Marquette et al.

(10) Patent No.: US 12,502,828 B2
(45) Date of Patent: Dec. 23, 2025

(54) ADDITIVE MANUFACTURING METHOD DEPOSITING MATERIAL WITHIN A GRANULAR CONSTRAINED MEDIUM

(71) Applicants: UNIVERSITE CLAUDE BERNARD LYON 1, Villeurbanne (FR); CENTRE NATIONAL DE LA RECHERCHE SCIENTIFIQUE, Paris (FR); INSTITUT NATIONAL DES SCIENCES APPLIQUEES DE LYON, Villeurbanne (FR); ECOLE SUPERIEURE DE CHIMIE, PHYSIQUE, ELECTRONIQUE DE LYON, Villeurbanne (FR)

(72) Inventors: Christophe Marquette, Villeurbanne (FR); Edwin-Joffrey Courtial, Villeurbanne (FR); Alizée Delbarre, Sevrier (FR); Arthur Colly, Villeurbanne (FR)

(73) Assignees: UNIVERSITE CLAUDE BERNARD LYON 1, Villeurbanne (FR); CENTRE NATIONAL DE LA RECHERCHE SCIENTIFIQUE, Paris (FR); INSTITUT NATIONAL DES SCIENCES APPLIQUEES DE LYON, Villeurbanne (FR); ECOLE SUPERIEURE DE CHIMIE, PHYSIQUE, ELECTRONIQUE DE LYON, Villeurbanne (FR)

( * ) Notice: Subject to any disclaimer, the term of this patent is extended or adjusted under 35 U.S.C. 154(b) by 838 days.

(21) Appl. No.: 17/297,558

(22) PCT Filed: Nov. 29, 2019

(86) PCT No.: PCT/FR2019/052865
§ 371 (c)(1),
(2) Date: May 27, 2021

(87) PCT Pub. No.: WO2020/109745
PCT Pub. Date: Jun. 4, 2020

(65) Prior Publication Data
US 2021/0402685 A1  Dec. 30, 2021

(30) Foreign Application Priority Data
Nov. 30, 2018  (FR) ........................................ 1872173

(51) Int. Cl.
*B29C 64/165* (2017.01)
*B29C 64/393* (2017.01)
(Continued)

(52) U.S. Cl.
CPC .......... *B29C 64/165* (2017.08); *B29C 64/393* (2017.08); *B33Y 10/00* (2014.12);
(Continued)

(58) Field of Classification Search
CPC ............................ B29C 64/364; B29C 64/371
See application file for complete search history.

(56) References Cited

U.S. PATENT DOCUMENTS 524,747 A    8/1894  Weber
5,516,481 A  5/1996  Ishizaki et al.
(Continued)

FOREIGN PATENT DOCUMENTS

CN  105246498 A  1/2016
CN  106807944 A  6/2017
(Continued)

OTHER PUBLICATIONS

Chinese First Office Action for Chinese Application No. 201980078374. 6, dated Aug. 23, 2022, 12 pages (English translation).
(Continued)

*Primary Examiner* — Xiao S Zhao
*Assistant Examiner* — Nicholas J Chidiac
(74) *Attorney, Agent, or Firm* — TraskBritt

(57) ABSTRACT

An additive manufacturing process and device implement the deposition of a material to form a three-dimensional
(Continued)

object. The process includes depositing the material in suspension within a stressed granular medium that comprises a granular phase and a gaseous interstitial phase. The granular phase consists solely of a material taking the form of discrete, solid elements that interact in regions of contact therebetween.

23 Claims, 3 Drawing Sheets

(51) Int. Cl.
  *B33Y 10/00* (2015.01)
  *B33Y 50/02* (2015.01)
  *B33Y 70/10* (2020.01)
  *C09D 1/00* (2006.01)
  *C09D 5/03* (2006.01)
  *C09D 131/04* (2006.01)
  *C09D 133/12* (2006.01)
  *C09D 183/04* (2006.01)

(52) U.S. Cl.
  CPC .............. *B33Y 50/02* (2014.12); *B33Y 70/10* (2020.01); *C09D 1/00* (2013.01); *C09D 5/031* (2013.01); *C09D 131/04* (2013.01); *C09D 133/12* (2013.01); *C09D 183/04* (2013.01)

(56) References Cited

U.S. PATENT DOCUMENTS

| | | | |
|---|---|---|---|
| 10,119,108 B2 * | 11/2018 | Maggiore | B33Y 30/00 |
| 2003/0090034 A1 | 5/2003 | Mülhaupt et al. | |
| 2006/0103847 A1 | 5/2006 | Moulas et al. | |
| 2014/0271961 A1 | 9/2014 | Khoshnevis | |
| 2015/0335407 A1 | 11/2015 | Korten et al. | |
| 2015/0367415 A1 | 12/2015 | Buller et al. | |
| 2016/0068793 A1 * | 3/2016 | Maggiore | C12M 41/12 901/22 |
| 2016/0075085 A1 | 3/2016 | Sasaki | |
| 2016/0101120 A1 | 4/2016 | Maquart et al. | |
| 2016/0167312 A1 | 6/2016 | Feinberg et al. | |
| 2016/0288206 A1 | 10/2016 | Ohtaki et al. | |
| 2017/0189960 A1 | 7/2017 | Ibe | |
| 2017/0361534 A1 * | 12/2017 | Fernandez-Nieves | B29C 64/40 |
| 2018/0057682 A1 | 3/2018 | Angelini et al. | |
| 2018/0200714 A1 | 7/2018 | Viovy et al. | |
| 2018/0265839 A1 * | 9/2018 | Retting | C12N 5/0656 |
| 2019/0009338 A1 | 1/2019 | McMurtry et al. | |
| 2019/0160739 A1 * | 5/2019 | Olson | C08L 35/02 |
| 2020/0055234 A1 * | 2/2020 | Watanabe | C08G 75/02 |
| 2020/0198178 A1 | 6/2020 | Monroe et al. | |
| 2021/0154368 A1 * | 5/2021 | Alsberg | B33Y 10/00 |
| 2022/0055112 A1 * | 2/2022 | Torabi | B28B 1/001 |
| 2022/0055287 A1 | 2/2022 | Fernandez-Nieves et al. | |

FOREIGN PATENT DOCUMENTS

| | | | |
|---|---|---|---|
| CN | 107548345 A | 1/2018 | |
| CN | 107614264 A | 1/2018 | |
| CN | 107847934 A | 3/2018 | |
| CN | 108859097 A | 11/2018 | |
| EP | 1606608 B1 | 8/2014 | |
| EP | 3159141 A1 | 4/2017 | |
| EP | 3117982 B1 | 12/2019 | |
| JP | 2003-533367 A | 11/2003 | |
| JP | 2004-232043 A | 8/2004 | |
| JP | 2016-060047 A | 4/2016 | |
| JP | 2017-132246 A | 8/2017 | |
| JP | 2018-500894 A | 1/2018 | |
| WO | 2006/093778 A2 | 9/2006 | |
| WO | 2011/021080 A2 | 2/2011 | |
| WO | 2016/090286 A1 | 6/2016 | |
| WO | 2017/019102 A1 | 2/2017 | |
| WO | 2018/187780 A1 | 10/2018 | |
| WO | WO-2019199899 A1 * | 10/2019 | A61L 27/20 |

OTHER PUBLICATIONS

International Search Report for International Application No. PCT/FR2019/052865, mailed Apr. 28, 2020, 10 pages (with English Translation).

International Written Opinion for International Application No. PCT/FR2019/052865, mailed Apr. 28, 2020, 8 pages (with Electronic Machine Translation).

European Communication pursuant to Article 94(3) EPC for European Application No. 19868196, dated Nov. 2, 2022, 5 pages.

Chinese Search Report for Chinese Application No. 2019800783746, dated Aug. 16, 2022, 5 page English translation.

Chinese Supplementary Search Report for Chinese Application No. 2019800783746, dated May 6, 2023, 4 page English translation.

Japanese Decision to Grant for Japanese Application No. 2021-530245, dated May 21, 2024, 5 pages with English translation.

Japanese Notice of Reasons for Refusal for Japanese Application No. 2021-530245, dated Aug. 15, 2023, 8 pages with English translation.

Li, Jian et al., "Application of bamboo-plastic composite powder laser sintered parts in investment casting," Sci. & Tech. Herald, vol. 34, No. 19 (2016), pp. 96-100.

Li, Junfeng et al., "Research Progress of Laser Selective Zone Melting Technology for Titanium and Titanium Alloys," Advances in Lasers & Optoelectronics, vol. 55 (2017), 011403-1 to 011403-18.

Li, Junye et al., "Numerical analysis and experimentation of micro-miniature hole machining based on CFD-DEM coupling for abrasive flow," Transactions of the Chinese Soc'y of Agric. Eng'g, vol. 34, No. 16 (2018), pp. 80-88.

Li, Li et al., "Analysis of the properties of laser selective zone melting powder for additive manufacturing," Advanced Materials Indus., No. 1, (2018), pp. 56-60.

Nguyen, Quy Bau et al., "Characteristics of Inconel Powders for Powder-Bed Additive Manufacturing," Eng'g, vol. 3, No. 5 (2017), pp. 695-700.

Shao, Wei et al., "Overview of Patented Technologies for Grippers with Granular Material Filling," Tech. Outlook, No. 06 (2017), p. 308.

* cited by examiner

ADDITIVE MANUFACTURING METHOD DEPOSITING MATERIAL WITHIN A GRANULAR CONSTRAINED MEDIUM

CROSS-REFERENCE TO RELATED APPLICATIONS

This application is a national phase entry under 35 U.S.C. § 371 of International Patent Application PCT/FR2019/052865, filed Nov. 29, 2019, designating the United States of America and published as International Patent Publication WO 2020/109745 A1 on Jun. 4, 2020, which claims the benefit under Article 8 of the Patent Cooperation Treaty to French Patent Application Serial No. 1872173, filed Nov. 30, 2018.

TECHNICAL FIELD

The disclosure relates to the field of additive manufacturing and pertains to a process and device for processing the material in which a part is made, during the production of this part.

Additive manufacturing, also called "3D printing," is a manufacturing technology that allows three-dimensional parts to be produced by stacking successive layers of material additively. In the present description, the term "printing" is employed to designate the production of a part using an additive manufacturing process, and the term "printed material" designates the material that is formed during this process and from which all or some of the manufactured part is made.

BACKGROUND

Currently, most additive manufacturing processes may be grouped into three large families: processes involving deposition of material; processes involving selective consolidation; and processes involving spraying binder onto a powder.

In processes involving deposition of material, the printed material is a fed material—supplied in the form of a wire, of granules or of a liquid—that is sprayed or deposited layer by layer. It is, for example, a question of FDM, LDM or MJP processes (FDM, LDM and MJP being the acronyms of Fused Deposition Modeling, Liquid Deposition Modeling and MultiJet Printing, respectively). To produce complex parts with long cantilevers (or large overhangs), these processes require plinths and supports to be used, these plinths and supports being printed in addition to the part and holding the part in position or preventing cantilevered parts from collapsing. In such processes, the use of a printed material having unsuitable flow properties (for example: low viscosities, insufficiently high threshold stress or material exhibiting a notable thixotropic behavior) is impossible or limited to parts of very simple shapes.

In processes involving selective consolidation, the printed material is placed in a tank, in liquid form or in powder form, and an energy-delivering means such as a laser scans this material, layer by layer, successively. The printed material is itself optionally distributed to the tank in successive layers, before the passage of the energy-delivering means. The printed material contained in the tank solidifies solely in the exact locations scanned by the energy-delivering means. There is no fed material; all the printed material is contained in the tank. At the end of the process, a selective segment of the material initially contained in the tank forms the finished part. Examples of processes involving selective consolidation are stereolithography, selective laser melting (SLM), selective laser sintering (SLS), or even electron beam melting (EMB). These processes are applicable to various families of materials such as metals, ceramics or polymers in the form of solid powders, or of liquids that are settable via delivery of energy or photochemical activation (UV inter alia). Application to a very fluid printed material is possible only if this material is settable with a light source, and application to soft materials is not very straightforward.

In processes involving spraying binder onto a powder (binder jetting, for example), a binder is sprayed onto a powder successively arranged in layers in a tank. In the locations where the binder is sprayed, the binder mixes with the powder and reacts therewith, thereby creating a solid material made up of binder and powder. The printed material is created following the spray of binder and therefore consists of a composite assembly of binder and powder. These processes do not allow homogeneous parts of a single printed material that is, at the time of deposition, molten or not yet polymerized to be produced. The manufacture of parts from a single, very fluid or soft printed material is impossible.

Patent application US2018057682 describes an additive manufacturing process that falls outside the conventional categories described above. In this process, the printed material is a silicone-based ink. This printed material is deposited in the liquid state in a gel formed from polymer microgel particles. Each of the microgel particles comprises a crosslinked polymer network and an organic solvent. More precisely, the microgel particles are swollen with an organic solvent such as mineral oil. The proportion by mass of the organic solvent in the gel is preferably within a range from 90% to 99.9%, or within a range from 80% to 95%, or greater than 85%. According to this document, the interfacial surface tension between the silicone and the organic solvent is such that the silicone-based ink may be printed with the gel as the suspending phase, this allowing silicone parts to be printed. The described examples indicate average microgel-particle diameters within a range from 2 μm to 6 μm, or within a range from 0.1 μm to 100 μm. According to the described embodiments, the gel may consist of particles that preferably become malleable or fluid under a mechanical, electrical, radiant, photonic, or other action. In certain embodiments, the gel may be processed to remove solvent and form a powder that may be bagged easily for transport and sale, thereby avoiding the need for the expensive containers required by an oil-based product, which is basically liquid. In this case, before printing, the user must reconstitute the gel by mixing the powder with an appropriate amount of organic solvent. This process allows supple silicone parts to be printed, this being difficult if not impossible, with conventional processes. However, the formulation of the gel is complex and poses problems as regards storage, safety, and handling. Moreover, the silicone-depositing nozzle leaves a groove in the gel that closes only imperfectly, this leading to slow printing speeds and imperfections in the printed parts.

BRIEF SUMMARY

The aim of the disclosure is to improve the additive manufacturing processes of the prior art.

To this end, the disclosure relates to an additive manufacturing process including the deposition of a material to form a three-dimensional object, in which process at least one step involves depositing the material in suspension within a stressed granular medium that comprises:

a granular phase consisting solely of a material taking the form of discrete, solid elements that interact in regions of contact therebetween; and a gaseous interstitial phase.

Such an additive manufacturing process is suitable for materials that have flow properties, fluid materials in particular, for soft materials, and for viscoelastic materials. 3D objects of complex shapes, such as organic tissues, may thus be printed with the required quality and at high printing speeds because of the stress applied, by the stressed granular medium, to the whole of the surface of the part produced. The discrete elements from which the stressed granular medium is made conform to their container and to the shape of the object printed therein by dry flow, discrete-element surface against discrete-element surface.

The granular medium is said to be "stressed" because the elements from which it is made are stressed by one another, and are thus able themselves to exert a stress on the printed material. In a preferred example, the granular medium is stressed by the gravity exerted on each element of the granular medium. A tray containing the granular medium may supplement this stress due to gravity by maintaining the granular medium between its walls.

Another subject of the disclosure is an additive manufacturing device for implementing the process such as described above. This device comprises a printing tray containing a stressed granular medium comprising: a granular phase consisting solely of a material taking the form of discrete, solid elements that interact in regions of contact therebetween; and a gaseous interstitial phase.

According to one embodiment of the device, the latter comprises a device for adjusting the pressure of the stressed granular medium.

The additive manufacturing process may comprise the following additional features, either alone or in combination:

the granular phase has an angle of repose smaller than 40°;
the granular phase has a compressibility lower than 200 m/N;
the granular phase has a Carr index lower than 25;
the ambient conditions under which the stressed granular medium is placed are present between the discrete elements;
the granular phase is a single-phase material, which is cross-linked or amorphous or crystallized;
the granular phase is a powdered polymer;
the granular phase is a powdered dehydrated silica gel;
the granular phase is a powdered polyvinyl acetate;
the granular phase is a powdered polymethyl methacrylate;
the granular phase is composed of sodium bicarbonate;
the granular phase is composed of sand;
the granular phase is composed of cenospheres;
the average diameter of the cenospheres is 100 µm to 200 µm;
the density of the material from which the cenospheres are made is 0.6 g/cm$^3$ to 0.8 g/cm$^3$;
the bulk density of the cenospheres is 0.3 g/cm$^3$ to 0.5 g/cm$^3$;
the deposited material has a viscosity within a range from $10^{-1}$ mPa·s to $10^7$ mPa·s and preferably within a range from $10^2$ mPa·s to $10^6$ mPa·s;
the process further comprises a step of adjusting the pressure of the stressed granular medium;
the process further comprises a step of controlling the temperature of the stressed granular medium;

the gaseous interstitial phase comprises an inert gas;
the gaseous interstitial phase comprises air;
the deposited material is a cross-linkable silicone composition that, after cross-linking, forms a silicone elastomer; and/or
the granular phase is composed of granules of ground silicone.

BRIEF DESCRIPTION OF THE DRAWINGS

Other features and advantages of the disclosure will become apparent from the completely non-limiting description thereof that is given below, by way of indication, with reference to the accompanying drawings, in which.

DETAILED DESCRIPTION

Figure 1:
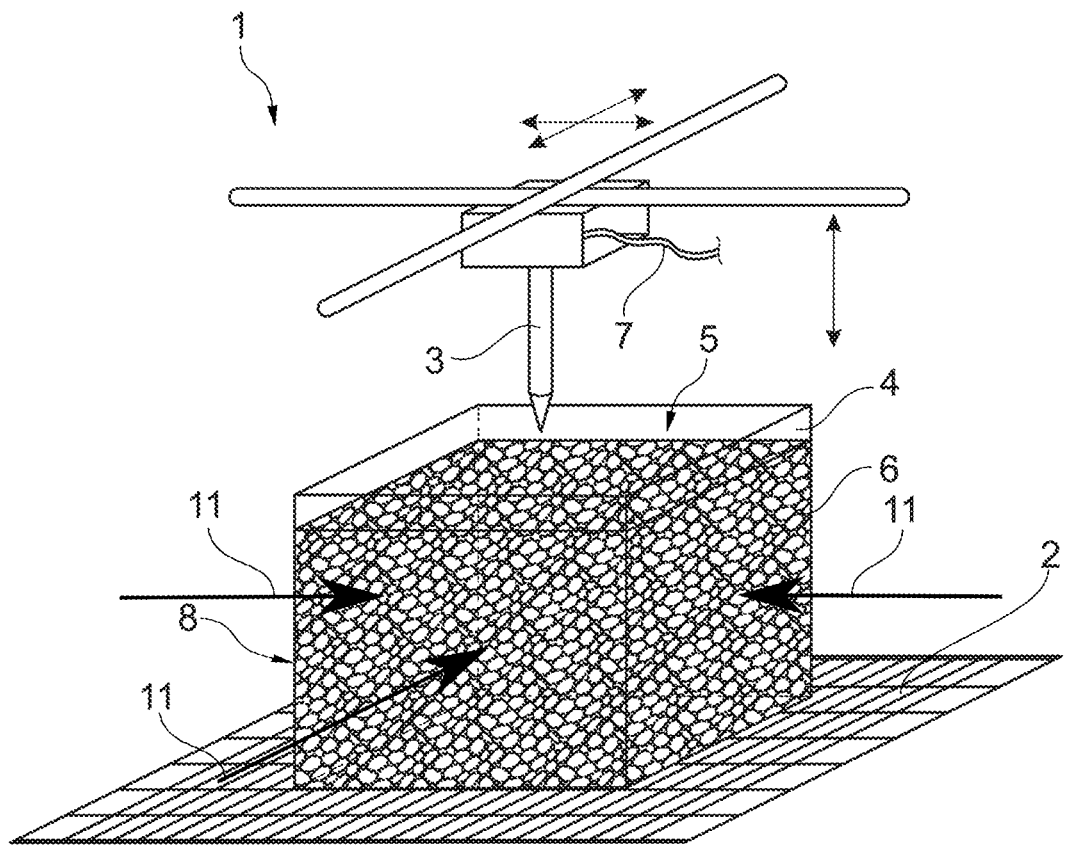
FIG. 1 is a general schematic view of a device according to the disclosure.

FIG. 1 schematically shows an additive manufacturing device according to the disclosure. This device is, in the present example, a 3D printer 1 that comprises a plate 2 and a head for depositing material. The material-depositing head is here a printing nozzle 3.

The printing nozzle 3 is movable relative to the plate 2 (for example: via three orthogonal translations in Cartesian printers) in such a way that the end of the nozzle is able to occupy any point in the useful printing volume. The mechanical devices allowing these three translations are well known in the field of 3D printers and will not be described in more detail here.

The useful printing volume is defined by a printing tray 4 that is fastened to the plate 2. The tray 4 is, in the present example, parallelepipedal and forms a container comprising an upper aperture 5.

Figure 2:
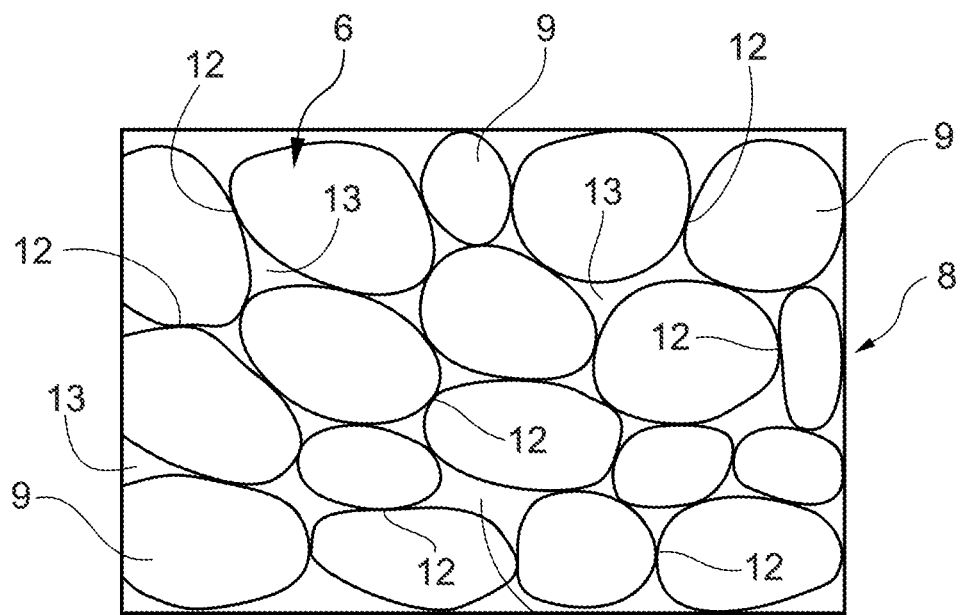
FIG. 2 is an enlarged view of the stressed medium of the device according to FIG. 1.

The tray 4 contains a stressed granular medium 8 that consists of a granular phase 6 and a gaseous interstitial phase 13 (see FIG. 2, which is an enlarged view of the stressed granular medium). In FIG. 1, the tray 4 is made of a transparent material allowing the stressed granular medium 8 that is contained therein to be seen.

The granular phase 6 of the stressed granular medium 8 is a set of independent and monodisperse physical elements, the aspect ratios of which may be different. The granular phase may be, for example, a powdered solid, provided that: this powdered solid is monodisperse, i.e., all the particles from which it is composed have the same size or a very similar size; and that it is homogeneous, i.e., it has the same properties, or very similar properties, everywhere.

The granular phase 6 is a continuous network of solid particles of the same size. In other words, the particles touch one another and the interactions between the particles within the stressed granular medium are governed by collective mechanisms. Neither fluid nor solid, a stressed granular medium does not behave like a solid because it is deformable, dispersible and able to flow, and does not behave like a liquid since, for example, when it is compressed it expands. The stressed granular medium according to the disclosure differs from the gels filled with particles of cross-linked polymers of the prior art, in which gels the particles are in an organic solvent that solvates them. In these prior-art gels, the particles therefore do not necessarily touch one another and their mechanical properties result from more complex interactions related to the solvation.

The gaseous interstitial phase 13 is preferably air, so that the ambient air in which the 3D printer 1 is placed is also found in the interstices of the granular phase 6. As a variant, the gaseous interstitial phase 13 may comprise an inert gas, or an inert gas mixture (the tray 4 then being placed in a seal-tight enclosure filled with the desired gas). The gaseous interstitial phase 13 may also comprise a small amount of air present after the tray 4 has been placed under vacuum.

The mechanics of the 3D printer 1 and its mode of axial control are identical to those of a 3D printer that prints by depositing material. Thus, a digital model of the part to be printed is first created and then sliced into a set of successive horizontal planes. For each of these slices, the nozzle 3 will then be commanded to deposit a printed material in defined locations. The printed material is thus deposited layer by layer until the finished part is formed.

The printed material is fed to the nozzle 3 via a feed channel 7, which is schematically shown in FIG. 1 and which may be of any type suitable for the chosen printed material.

The feed channel 7 may take the form of a wire or of granules of material, in the case where the feed material is thermoformable and packaged in the form of a coil of wire or a tub of granules, respectively. In the case of a coil of wire, the latter is unwound and the wire of material is passed to the nozzle 3. In the case of a tray of granules, the latter are driven by an extrusion screw and passed to the nozzle 3. In any case, the nozzle 3 is able to heat the wire or the granules of the material above its melting point and to deposit it in this molten form.

The feed channel 7 may also, for example, he a tube through which the printed material flows if the latter is sufficiently fluid. The printed material may, in this case, be made to flow by a pump or a piston-based device such as a syringe (neither being shown) mounted on the nozzle 3 or elsewhere on the device.

Whatever the type of feed channel 7, the nozzle 3 is able to deliver, via its end, the printed material in a sufficiently fluid state to be deposited.

FIG. 2 is an enlarged view of a segment of the stressed granular medium 8. The granular phase 6 is a mass of discrete elements 9 (e.g., discrete solid elements). This mass, because of its powdered and non-cohesive character, conforms to the shape of the tray 4 by virtue of a spontaneous arrangement of these discrete elements 9, which bear against one another under the effect of their own weight, as shown in FIG. 2. The discrete elements 9 interact with one another by bearing against regions of contact 12 that each discrete element 9 has with the discrete elements 9 surrounding it. The stressed granular medium 8 comprises these discrete elements 9 and, between the discrete elements 9, the gaseous interstitial phase 13. The mechanical behavior of the stressed granular medium 8 is due only to the modification of the contacts (e.g., regions of contact 12) between the discrete elements 9, the gaseous interstitial phase 13 having no influence, the latter phase participating in the mechanical behavior of the stressed granular medium 8 only insofar as it allows the regions of contact 12 between discrete elements 9 to be modified.

The discrete elements 9 are preferably non-deformable (excluding a slight elastic deformation) so that gaps filled with air (or any other fluid surrounding the 3D printer 1) that together form the gaseous interstitial phase 13 are created between the discrete elements 9 bearing against one another. Specifically, the ambient conditions of the stressed granular medium are also present between the discrete elements. Thus, if the 3D printer 1 is in the air of the Earth's atmosphere, this air will be present in the gaps. Likewise, if the 3D printer 1 is, for example, in a vacuum chamber, this vacuum will then also be present in the gaps. The notion of vacuum here refers to a situation in which a high negative pressure is created in the gaps between the granular phase 6, i.e., in the gaseous phase, which then comprises very little air.

Figure 3:
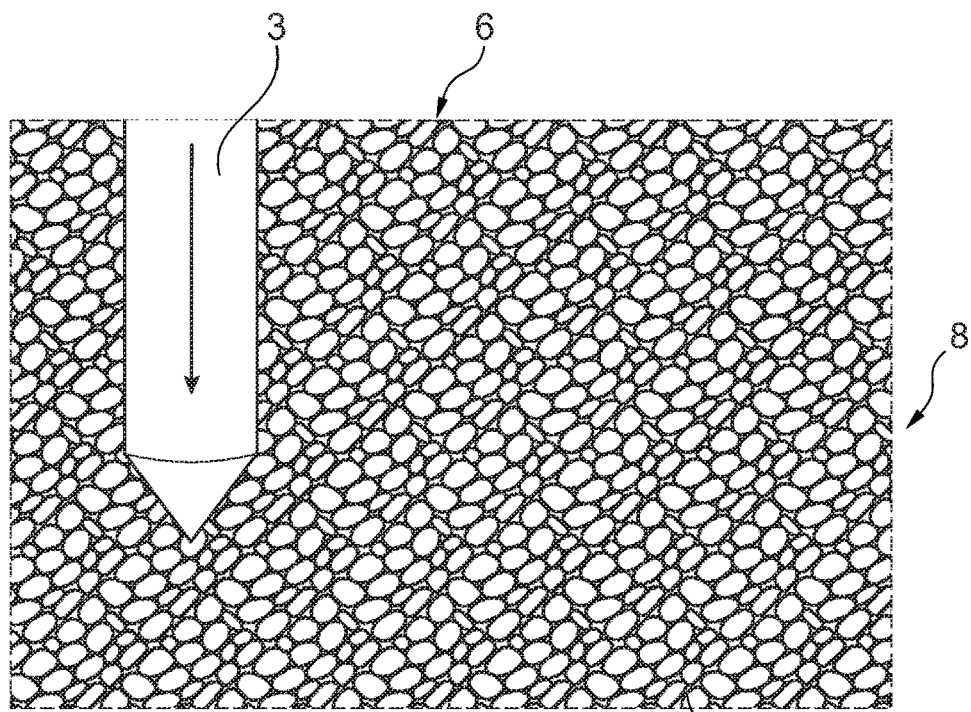
FIG. 3 illustrates the work of the nozzle of the device of FIG. 1, in the stressed granular medium.

With reference to FIG. 3, the ability of the discrete elements 9 to move relative to one another within the stressed granular medium 8 allows the nozzle 3 to be introduced into the stressed granular medium 8, via a displacement of the discrete elements 9 around it. FIG. 3 is a schematic view in a cross-sectional plane cut through the longitudinal axis of the nozzle 3 and shows the nozzle 3 after it has been introduced vertically into the stressed granular medium 8.

Figure 4:
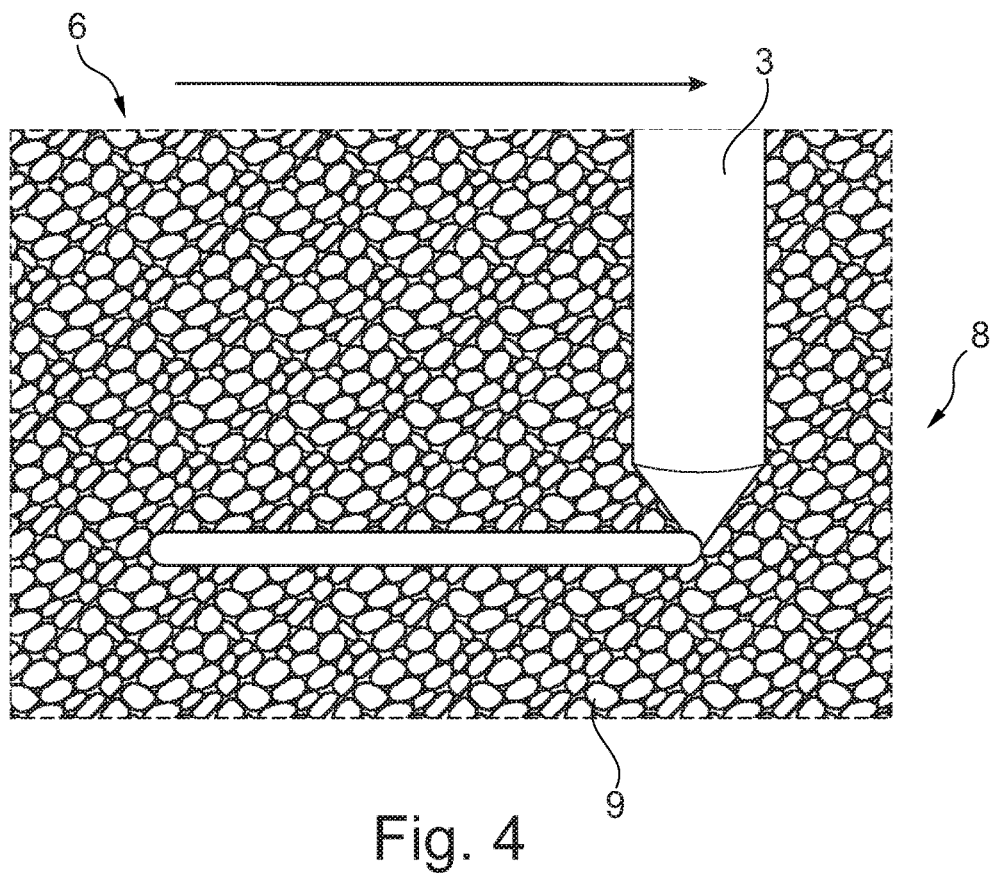
FIG. 4 illustrates the work of the nozzle of the device of FIG. 1, in the stressed granular medium.

With reference to FIG. 4, this same ability of the discrete elements 9 to move relative to one another allows the nozzle 3 to move within the stressed granular medium 8 and the printed material to be deposited during this movement. During the movement of the nozzle 3, the latter displaces the discrete elements 9 present on its path while, behind it, the discrete elements 9 reassemble and fill the void left. The granular phase 6 therefore retains its homogeneity around the nozzle, no wake or other disturbance forming.

The stressed granular medium 8 creates, around the deposited printed material, a stress that guarantees that the printed material keeps the outline given thereto by the nozzle 3. This form of restraint is particularly advantageous in the case of a very fluid printed material that would flow in the absence of this stress. Since the printed material is held by this stressed medium, the external surface furnish of the finished part may depend on the particle size of the granular phase 6.

The particle size of the granular phase 6 is preferably within a range from 1 µm to 1000 µm, advantageously within a range from 25 µm to 250 µm and more advantageously within a range from 75 µm to 150 µm (the values given are the "D50" of the distribution). Although this preferred particle size allows the granular phase 6 to be easily employed during the implementation of printing, particle size is not however the most important characteristic of the granular phase as regards printing quality.

The stressed granular medium 8 performs its function by being dry and may therefore contain any type of base materials, such as unstable fluid materials or any polymer before cross-linking, without risk of reaction between the freshly deposited material and the stressed medium. This is particularly advantageous in the health field.

The stressed granular medium 8 ensures that the printed material is held in position for as long as required for it to set, irrespectively of whether it is set via a thermal, chemical or photo-chemical treatment or any other operation. In the case of setting via exposure to radiation, the tray 4 is preferably transparent and the powdered solid is at least partially translucent so as not to absorb the light source.

Figure 5:
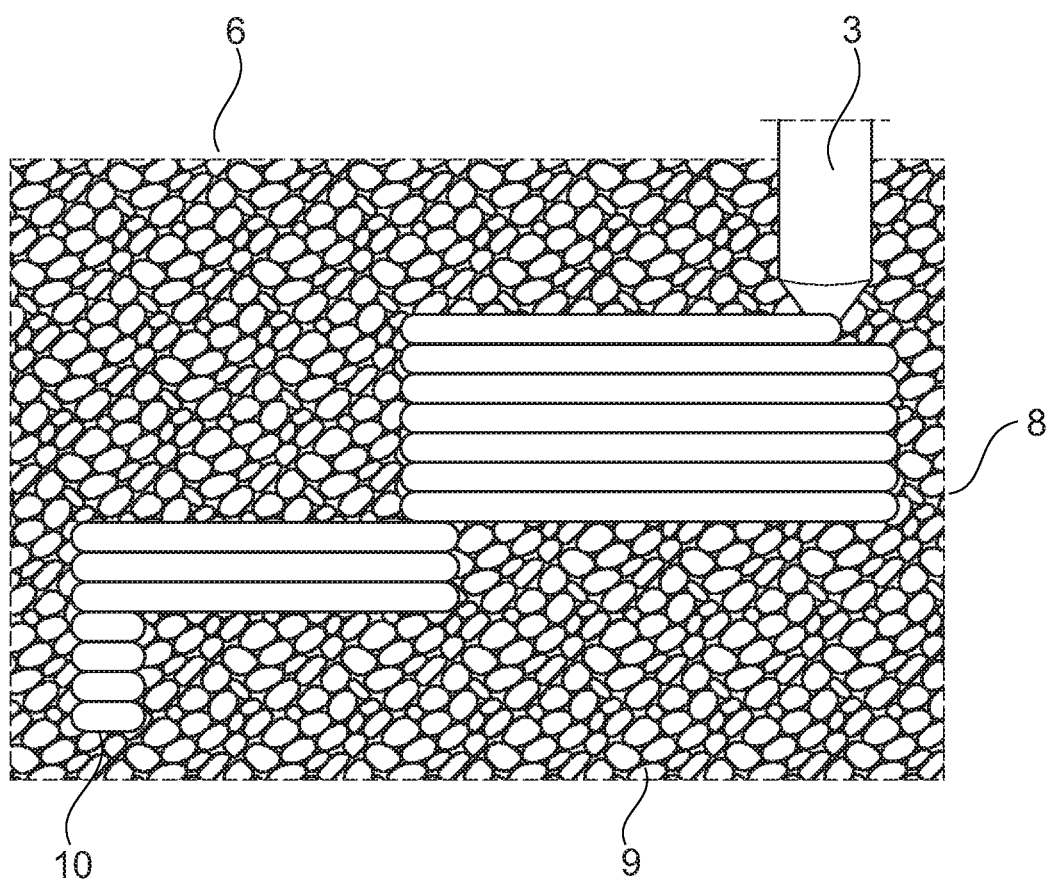
FIG. 5 illustrates the work of the nozzle of the device of FIG. 1, in the stressed granular medium.

FIG. 5 is a vertical cross section of the stressed granular medium 8 showing the profile of a part 10 in the process of production. The part 10 is a simple example of a part that is easily printable in the stressed granular medium 8, with maximum quality, even though this part comprises long cantilevers and abrupt changes in cross section. Such a part, may, in addition, be printed with a fluid printed material, such as a polymer in its rubbery phase (temperature higher than or equal to its glass transition temperature) or liquid phase (temperature higher than or equal to its melting point, a polymer based on a semi-crystalline thermoplastic for example being used) or a cross-linkable silicone composition. The stressed granular medium 8 not only provides support for cantilevered portions of the part 10 and abrupt changes in cross section, but also exerts a form of bulk stress on each layer of printed material, i.e., a stress on the entire outline of the deposited material.

The stressed medium provides a stable medium for setting the printed material, even if the printed material was printed at high temperature.

The part 10, once completed, is then extracted from the stressed granular medium 8 and is usable directly because it did not require plinths, supports or other external additions to the shape of the part, to be printed. The material from which the part 10 is made is solely the printed material that was fed to the nozzle 3 via the feed channel 7. No printed material is left within the stressed granular medium 8, and it may immediately be reused to print new parts.

The granular phase is preferably a non-hydrated (no emulsion), cross-linked or amorphous or crystallized material, and preferably consists of a ground solid material. Dehydrated silica gel (which, although bearing this name, is not a gel at all but a solid), polyvinyl acetate, or indeed polymethyl methacrylate, by way of granular phases associated with air as an interstitial phase, gives excellent results because it is possible to print, in a stressed granular medium made from one of these materials, complex parts with, as printed material, materials with a wide range of viscosities, ranging from $10^{-1}$ mPa·s to $10^7$ mPa·s. By way of comparison, materials the viscosity of which is close to $10^{-1}$ mPa·s to $10^3$ Pa·s are quite simply impossible to print with conventional material-deposition processes (such processes were mentioned above), and are difficult to print in a gel made up of particles of hydrated polymer microgel, i.e., printing is possible but generates parts with a low-quality level (presence of dimensional and shape-related defects).

All the viscosities mentioned in the present description correspond to dynamic Newtonian viscosities at 25° C., i.e., to the dynamic viscosity that is measured, in a manner known per se, with a Brookfield viscometer at a shear rate low enough for the measured viscosity to be independent of shear rate.

For example, a cross-linkable silicone composition taking the form of a one-component or two-component material in the indicated viscosity range, i.e., $10^2$ mPa·s to $10^6$ mPa·s, may be used as printed material, a satisfactory quality being obtained even with complex parts.

Moreover, materials having a low yield stress may also be used as printed material. Such materials do not have a sufficient yield stress to maintain their shape under their own weight or under the compression of the deposited layers, and are however advantageously printable with the 3D printer according to the disclosure. Materials having a yield stress sufficient to keep their shape under their own weight may of course also be used as printed material.

According to one variant, the 3D printer 1 comprises a device for adjusting the pressure of the stressed granular medium 8. These means have been represented by arrows 11 in FIG. 1. In the stressed granular medium 8, the stress is thus adjustable. Specifically, the force exerted by a discrete element of the granular medium on the neighboring discrete elements may be controlled via this device for adjusting the pressure of the pressurized stressed medium in order to guarantee the quality of the printing. For example, the pressurization may be achieved pneumatically (increase in the atmospheric pressure of the enclosure of the 3D printer 1) or by mechanical or hydraulic means (increase in the internal pressure of the granular medium via application of a force to the walls of the tray 4). The process according to the disclosure comprises, according to this variant, a step of adjusting the pressure of the stressed granular medium. The pressure of the stressed granular medium here designates the pressure that the elements from which the granular medium is formed exert on one another. This variant is particularly suitable for use in gravity-less places.

According to another variant that is particularly suitable for printing thermoplastics, the stressed granular medium 8 is temperature-controlled. The stressed granular medium 8 may thus be heated or cooled to obtain a temperature suitable for the deposition of a particular material. The process according to the disclosure comprises, according to this variant, a step of controlling the temperature of the stressed granular medium.

Alternative embodiments may be envisioned without departing from the scope of the disclosure. For example, the stressed granular medium 8 may consist of a tray containing microbeads. Any other form may be envisioned for the discrete elements 9, provided that this form allows the discrete elements 9 to move relative to one another.

Furthermore, the stressed granular medium 8 enables alternative printing modes to layer-by-layer printing, such as modes of printing directly in three dimensions, i.e., with a movement of the nozzle simultaneously in the three dimensions of space.

Properties of the granular phase that are likely to improve printing, notably of materials having, during printing, a low viscosity have been characterized. Theoretical and practical research has determined, counter-intuitively, that the quality of the printing depends little on the particle size of the solid granular phase. Quality printing may thus be obtained with one granular phase of large particle size, whereas another granular phase of large particle size may give poor results. Likewise, quality printing may be obtained with a granular phase of small particle size, whereas another granular phase of small particle size may give poor results.

The printing quality referred to here relates to the production of a three-dimensional part having the shape and dimensions of the initial digital model. It has been determined that printing quality depends on the ability of the granular phase 6 to be displaced by the movement of the printing nozzle 3 within the stressed granular medium 8; on the ability of the granular phase 6 to rapidly close the groove dug in the stressed granular medium 8, after the passage of the printing nozzle 3; and on the ability of the granular phase 6 to support and stress the printed shapes before they solidify.

The following are the three most important characteristics of the solid granular phase, as regards printing quality:
 the angle of repose;
 compressibility; and
 castability.

The angle of repose, also called the "angle of rest" or even the "critical angle of repose," is a property of the granular phase that relates to its mechanical behavior under the effect of gravity. The angle of repose is, in the present example, measured according to the standard ISO 4324. In the present example, the granular phase 6 has an angle of repose smaller than 40°, and preferably smaller than 35°, or even smaller than 30°.

The compressibility of the granular phase 6 expresses how much it compresses under the effect of a force. Compressibility is expressed in m/N. In the present example, the granular phase 6 has a compressibility lower than 200 m/N, and preferably lower than 50 m/N.

The castability of the granular phase 6 relates to how easily it allows relative movements between its discrete elements 9, and notably how easily it conforms to the shape of a container. The castability is quantified, in the present example, by virtue of the Carr index of the granular phase 6. In the present example, the granular phase 6 has a Carr index lower than 25, and preferably lower than 6.

These properties of angle of repose, compressibility, and castability may, independently of one another, influence printing quality. Furthermore, the following combinations of these characteristics lead to the attainment of a granular phase conducive to quality printing:

- an angle of repose smaller than 40°, and preferably smaller than 35°, or even 30°, combined with a compressibility lower than 200 m/N, and preferably lower than 50 m/N;
- an angle of repose smaller than 40°, and preferably smaller than 35°, or even than 30°, combined with a Carr index lower than 25, and preferably lower than 6;
- a compressibility lower than 200 m/N, and preferably lower than 50 m/N, combined with a Carr index lower than 25, and preferably lower than 6; and
- an angle of repose smaller than 40°, and preferably smaller than 35°, or even smaller than 30°, combined with a compressibility lower than 200 m/N, and preferably lower than 50 m/N, and combined with a Carr index lower than 25, and preferably lower than 6.

By way of example, the table below lists types of materials that give good results when used as granular phase for printing:

| Solid granular phase | Particle size (Average particle radius in μm) | Angle of repose (in degrees) | Compressibility (m/N) | Castability (Carr index) |
|---|---|---|---|---|
| Washing powder | 320 | 33.06 | 157.95 | 22.01 |
| Finely ground coffee | 115 | 32.36 | 82.80 | 11.62 |
| Sugar | 451 | 30.71 | 67.60 | 9.20 |
| Sand | 431 | 29.60 | 43.80 | 5.94 |
| Cenospheres | 107 | 29.29 | 41.15 | 5.66 |
| Powdered PMMA | 91 | 20.45 | 32.25 | 4.69 |
| Sodium bicarbonate | 165 | 26.04 | 29.33 | 3.98 |
| Fine salt | 1200 | 32.33 | 27.98 | 3.82 |
| Silica | 102 | 17.74 | 15.08 | 2.28 |

Particularly advantageous results are obtained with a granular phase consisting of cenospheres, which are hollow beads, by virtue both of the shape of the surface and the elastic properties of such hollow beads. In the present example, the cenospheres are hollow polymer beads the average diameter of which is within a range from 100 μm to 200 μm, the density of the material of which is within a range from 0.6 g/cm$^3$ to 0.8 g/cm$^3$, and the bulk density of which (taking into account the hollow nature of the beads) is within a range from 0.3 g/cm$^3$ to 0.5 g/cm$^3$, and preferably within a range from 0.34 g/cm$^3$ to 0.44 g/cm$^3$.

Among these materials, the best results are obtained with powdered PMMA, sodium bicarbonate, silica, and cenospheres. Worse but still advantageous results are obtained with sand, washing powder, and fine salt. Results that are even worse but still satisfactory for parts not requiring high precision are obtained with sugar and finely ground coffee. Moreover, a granular phase consisting of ground silicone granules having an angle of repose within a range from 35° to 40° also gives good results.

In the present description, the values of the particle size of the granular phase are "D50" values (D50 being a qualifier of panicle-size distribution that is used in particle-size measurements), i.e., values designating the median size of the particles. In addition, unless otherwise specified, the characteristics indicated are measured under standard temperature, pressure and humidity conditions.

Furthermore, the granular phase may consist of granules of different materials. It may, for example, be a granular phase including a main material and containing traces of another material, or, for example, a combination of two materials that are different, but that have, in their role as granular phase, properties falling within the definition of the disclosure.

The invention claimed is:

1. An additive manufacturing process including the deposition of a material to form a three-dimensional object, wherein at least one step is carried out by a printing nozzle movable relative to a plate in such a way that an end of the printing nozzle is able to occupy any point in a useful printing volume defined by a printing tray that is fastened to the plate, the at least one step comprising depositing the material in suspension within a dry stressed granular medium contained in the printing tray, the depositing comprising moving the printing nozzle within the dry stressed granular medium and depositing the material during the moving, the dry stressed granular medium comprising:
   a dry granular phase consisting solely of a material taking the form of discrete, solid elements that interact in regions of contact therebetween; and
   a gaseous interstitial phase,
wherein the nozzle is introduced into the dry stressed granular medium via a displacement of the discrete elements around the nozzle.

2. The process as claimed in claim 1, wherein the dry granular phase has an angle of repose smaller than 40°.

3. The process as claimed in claim 1, wherein the dry granular phase has a compressibility lower than 200 m/N.

4. The process as claimed in claim 1, wherein the dry granular phase has a Carr index lower than 25.

5. The process as claimed in claim 1, wherein the ambient conditions under which the dry stressed granular medium is placed are present between the discrete elements.

6. The process as claimed in claim 1, wherein the dry granular phase is a single-phase material, which is cross-linked or amorphous or crystallized.

7. The process as claimed in claim 1, wherein the dry granular phase is a powdered polymer.

8. The process as claimed in claim 1, wherein the dry granular phase is a powdered dehydrated silica gel.

9. The process as claimed in claim 1, wherein the dry granular phase is a powdered polyvinyl acetate.

10. The process as claimed in claim 1, wherein the dry granular phase is a powdered polymethyl methacrylate.

11. The process as claimed in claim 1, wherein the dry granular phase is composed of sodium bicarbonate.

12. The process as claimed in claim 1, wherein the dry granular phase is composed of sand.

13. The process as claimed in claim 1, wherein the deposited material has a viscosity comprised between $10^{-1}$ mPa·s and $10^7$ mPa·s, wherein the viscosity is a dynamic Newtonian viscosity at 25° C.

14. The process as claimed in claim 1, further comprising a step of adjusting the pressure of the dry stressed granular medium.

15. The process as claimed in claim 1, further comprising a step of controlling the temperature of the dry stressed granular medium.

16. The process as claimed in claim 1, wherein the gaseous interstitial phase comprises an inert gas.

17. The process as claimed in claim 1, wherein the gaseous interstitial phase comprises air.

18. The process as claimed in claim 1, wherein the dry granular phase is composed of granules of ground silicone.

19. The process as claimed in claim 1, further comprising the dry stressed granular medium holding printed material in position for as long as required for the printed material to set via a thermal treatment.

20. The process as claimed in claim 1, wherein the dry granular phase is composed of cenospheres.

21. The process as claimed in claim 20, wherein the average diameter of the cenospheres is 100 to 200 μm.

22. The process as claimed in claim 20, wherein the density of the material from which the cenospheres are made is 0.6 to 0.8 g/cm³.

23. The process as claimed in claim 20, wherein the bulk density of the cenospheres is 0.3 to 0.5 g/cm³.

* * * * *